United States Patent
Eastcott et al.

[15] 3,698,750
[45] Oct. 17, 1972

[54] MEANS FOR ATTACHING A HUB TO A SHAFT

[72] Inventors: Peter de Hertel Eastcott; James Ernest Welch, both of Peterborough, Ontario, Canada

[73] Assignee: Canadian General Electric Company Limited, Ontario, Canada

[22] Filed: Jan. 29, 1971

[21] Appl. No.: 110,980

[30] Foreign Application Priority Data

Oct. 7, 1970    Canada.........................94981

[52] U.S. Cl. .............................................287/52 R
[51] Int. Cl. ...............................................F16d 1/06
[58] Field of Search ....................287/52, 53; 29/427

[56] References Cited

UNITED STATES PATENTS

| | | |
|---|---|---|
| 2,946,610 | 7/1960 | Jenness....................287/52 R |
| 2,992,479 | 7/1961 | Musser et al.............287/53 R |
| 2,348,293 | 5/1944 | Hamer.....................29/427 X |
| 2,926,940 | 3/1960 | Maass.....................287/53 R |
| 3,365,792 | 1/1968 | Groner et al............29/427 X |
| 3,267,568 | 8/1966 | Johnson et al..........29/427 X |

*Primary Examiner*—Andrew V. Kundrat
*Attorney*—Raymond A. Eckersley, Oscar B. Waddell, Joseph B. Forman and Frank L. Neuhauser

[57] ABSTRACT

A hub-shaft configuration wherein a hub having a stepped bore is an interference fit on a shaft having a stepped periphery, preferably five steps of approximately equal axial length. To assemble or disassemble the hub and shaft, a high pressure liquid is applied between the hub and the shaft to expand the hub. A multi stepped configuration reduces the distance that shaft must travel during assembly or disassembly over that necessary for the two-step configuration of the prior art and avoids the difficulties in machining tapers.

9 Claims, 5 Drawing Figures

PATENTED OCT 17 1972 3,698,750

INVENTOR.
PETER DEH. EASTCOTT
JAMES E. WELCH

BY

*Pa Eckersley*

Patent Agent (DETAIL "A")

(DETAIL "B")

INVENTOR.
PETER DEH. EASTCOTT
JAMES E. WELCH
BY
/Patent Agent

MEANS FOR ATTACHING A HUB TO A SHAFT

This invention relates to a stepped construction of a hub and shaft wherein the hub is secured to the shaft by means of an interference fit between the steps of the hub and shaft, and to means employing pressure liquid for expanding the hub for purposes of inserting or removing the shaft.

Securing a hub on a shaft by means of an interference fit is well known in the art. The assembly of the hub on the shaft may be carried out by pressing the shaft into the hub, providing a clearance or light press fit between the hub and shaft by means of a high temperature differential between them, or expanding the hub by means of a liquid applied at a high pressure between the hub and the shaft. In certain large apparatus, as for example, a main drive wheel for a friction mine hoist, the use of a high pressure liquid is the practical method for assembling or disassembling the wheel and shaft. It is the general method of this invention and its various aspects will now be considered in more detail.

In the use of high pressure liquid for expanding a hub, two hub-shaft configurations have been used. One, the shaft has a tapered surface conforming with a tapered bore in the hub. Two, the shaft and hub have two cylindrical portions of different diameters and of about equal axial length. This second configuration will be referred to as a two-step configuration. The tapered configuration is relatively easy to assemble and disassemble because the axial travel necessary while the hub is expanded is very small. However, a relatively high axial force is required to push the shaft home into its final resting place in the hub during assembly and release it from this place during disassembly. Another disadvantage is that properly seated external and internal tapers are difficult and expensive to machine. The two-step configuration is easier to machine than a tapered configuration. It requires a lower axial force for pushing the shaft into its final resting place in the hub but the distance that the shaft must travel is long, i.e., one half the axial length of the hub. This long travel makes assembly and disassembly difficult and greatly increases the chances of scoring the shaft-hub surfaces from one dragging on the other. If scoring should take place, the next assembly or disassembly operation becomes even more difficult.

This invention provides a multi-step hub-shaft configuration which combines the advantages of the two prior art configurations and yet avoids their main disadvantages. In a preferred embodiment of the invention the hub-shaft configuration has a number of cylindrical portions determined mathematically, e.g., five steps of approximately equal axial length. This configuration reduces significantly the distance that the shaft must travel during assembly or disassembly and avoids the more difficult machining necessary for tapers. Although more or less than five steps is possible, mathematically five steps is considered an optimum number.

A preferred embodiment of the invention will now be described in more detail in connection with the accompanying drawings, in which FIG. 1 is a perspective view in quarter section of a main drive wheel for a friction mine hoist embodying the invention;

Figure 1:
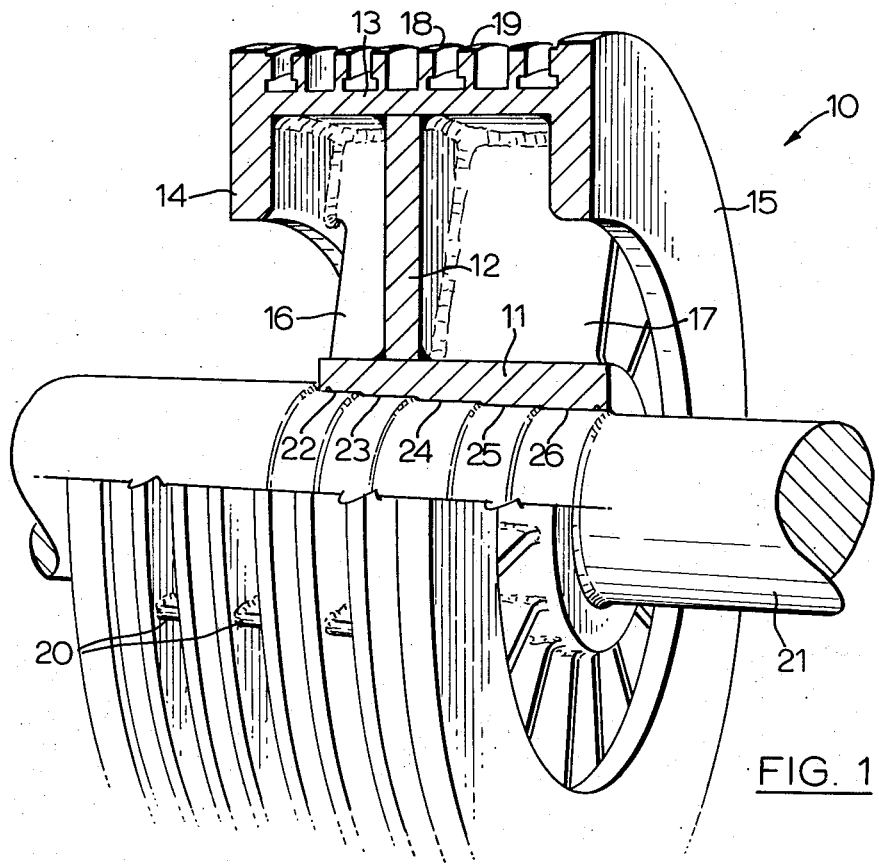

The construction of a main drive wheel for a friction mine hoist will now be described with reference to FIG. 1 in which the wheel is shown with its hub in the assembled position on a shaft. This particular wheel is of a type well suited for use of the invention. It is a welded structure 10 consisting of a solid cylindrical hub 11, a flat ring or disc 12, a cylindrical rim 13, a pair of annular flanges 14 and 15, a plurality of ribs 16 and 17, tread retaining flanges 18 and 19, and a plurality of reinforcing blocks 20. Ring 12 encircles the hub midway of its length with its flat sides at right angles to the axis of rotation of the hub, and rim 13 encircles the ring coaxial with the axis of rotation. Annular flanges 14 and 15 abut the ends of the rim with their centers on the axis of rotation, and each one has a substantial portion projecting radially inward from the rim toward the hub, leaving a relatively large annular opening between the flange and the hub, and a portion projecting radially outward from the rim. The outer surfaces of flanges 14 and 15 respectively are machined flat and smooth normal to the axis of rotation of the wheel, and are used as braking surfaces. Ribs 16 and 17 are equally spaced radially around the hub, extending therefrom to the ring, rim and flanges with their flat sides directed axially.

Hub 11 may be a heavy steel tube, and ring 12, flanges 14 and 15 and ribs 16 and 17 may be flat, rigid members cut from thick steel plate, the steel being of a kind that can be welded. Rim 13 is shaped circular from a plate of like material. Ring 12 is welded to hub 11 and rim 13; rim 13 is welded to flanges 14 and 15; and each one of the ribs 16 and 17 is welded to the hub, ring, rim and flanges. Tread retaining flanges 18 and 19 may be shaped from steel bars and welded to the periphery of ring 13, after which steel blocks 20 are inserted at spaced intervals between the pairs of flanges and welded to them and the rim. The tread receiving grooves defined by the flanges 18 and 19 may now be machined to the shaped shown in the figure. During the set-up for this machining operation, the outer faces of flanges 14 and 15 may be machined smooth and normal to the axis of rotation, and the hub bored coaxial therewith according to the invention to the size and stepped configuration necessary for an interference fit on the stepped shaft 21. This shaft will be supported in bearings for rotation of the wheel.

In FIG. 1, hub 11 and shaft 21 are shown with five cylindrical portions 22 to 26 of different diameters and of approximately equal axial length. These five portions are shown increasing in diameter from right to left in exaggerated steps for purposes of clearly illustrating the invention. They will be referred to hereinafter as steps or stepped portions. Each one of the steps 22 to 26 on the shaft is an interference fit in the mating step in the hub, and a clearance fit in the adjacent hub step of larger diameter, preferably a relatively close clearance fit. For example shaft steps 22 to 26 respectively are an interference fit in hub steps 22 to 26 respectively; and shaft step 23 is a clearance fit in hub step 22, shaft step 24 a clearance fit in hub step 23, and so forth. FIG. 1 shows the assembled state of the hub on the shaft, and in this state all of the steps should contribute fully to fastening the hub and shaft together for the strongest assembly.

Figure 2:
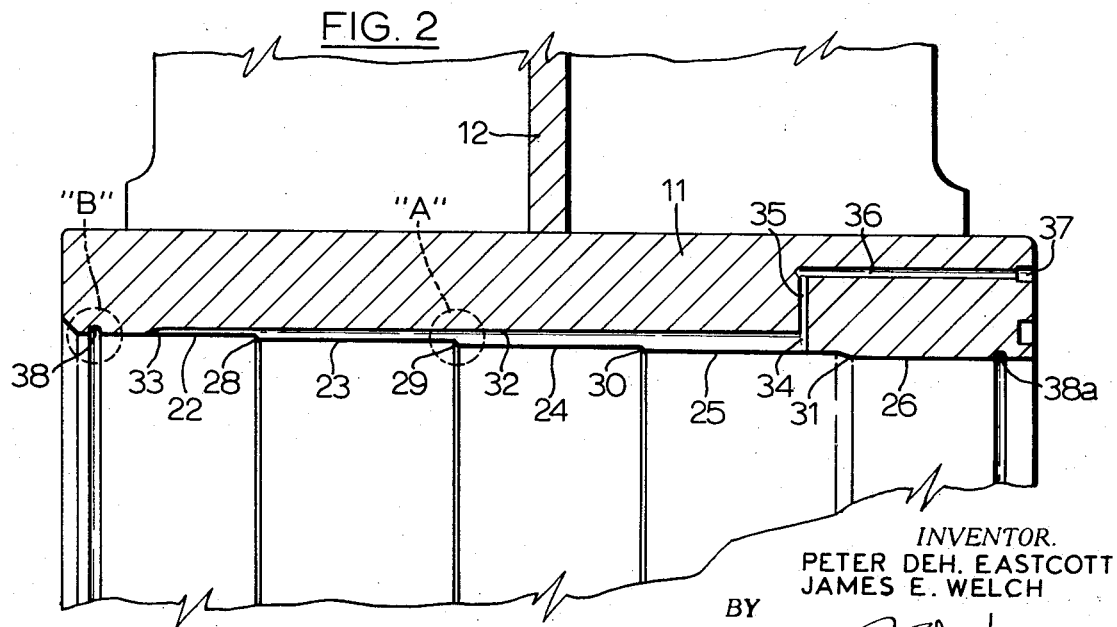
FIG. 2 is a section of the hub appearing in FIG. 1 showing more detail.
Figure 3:
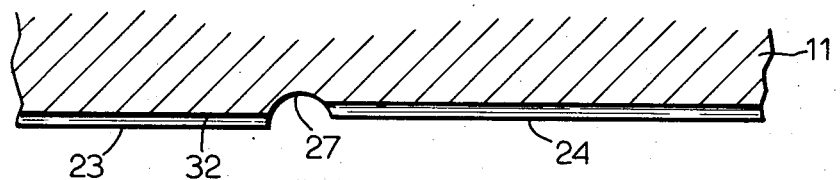
FIGS. 3 and 4 are enlargements of certain details shown in FIG. 2.
Figure 4:
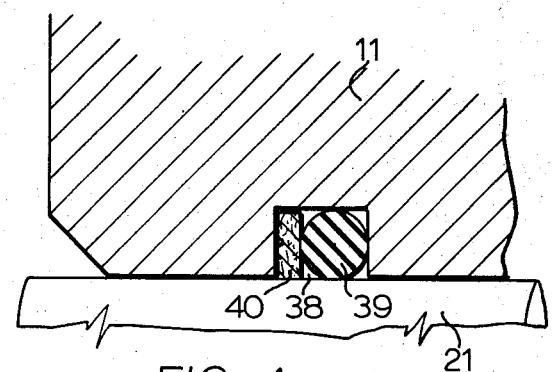

FIG. 2 shows a hub section in more detail and FIG. 3 and 4 show two specific details from FIG. 2 greatly enlarged. As best illustrated in FIG. 3 a small annular groove 27 is provided in the hub at each one of the step-in points 28, 29 and 30 where step 22 joins step 23, step 23 joins step 24, and step 24 joins step 25. A small axial groove 32 in the hub extends from a point 33 about midway of step 22 to a point 34 in step 25 near step-in point 31 and interconnects the annular grooves at points 28, 29 and 30. Grooves 27 and 32 are connected to a fluid flow passage 35, 36 beginning in groove 32 at point 34 and terminating in a fitting 37 in the end of the hub. By connecting a supply of high pressure liquid to fitting 37, the liquid can be be made to flow into the annular grooves 27 at step-in points 28, 29 and 30 by way of passage 36, 35 and groove 32. The purpose of this will be considered later. The step-in at point 31 may include an annular groove such as 27 or it may be a bevel between steps 25 and 26 such as shown in FIGS. 1 and 2.

The end of the hub of the largest step diameter has an annular groove 38 located in step 22 between the left end of the hub and the beginning 33 of groove 32. As best illustrated in FIG. 4, this groove contains a high pressure liquid sealing means which may consist of an O-ring seal 39 made of a high strength organic material and a disc seal 40 made of leather. Preferably, step 26 will also be provided with a like sealing means retained in a groove 38a in the hub near its right hand end.

Figure 5:
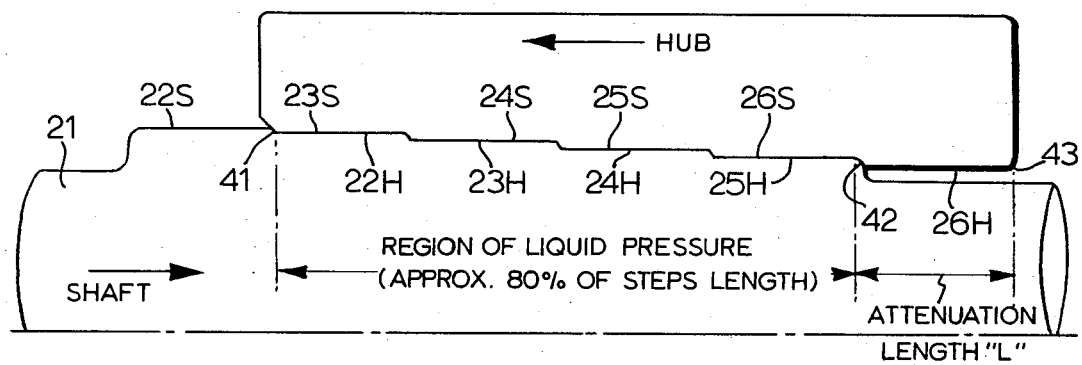
FIG. 5 is an elementary sketch illustrating assembling the hub on the shaft.

Reference should now be made to FIG. 5 where the shaft steps are identified with a suffix S and the hub steps with a suffix H. To assemble the hub and shaft, the shaft is inserted endwise into the bore of the hub, the smallest shaft step first into the largest hub step. During this maneuver the hub and shaft are carefully aligned axially. When the shaft is in place in the hub with its steps 23 to 26 located diametrically opposite hub steps 22 to 25 respectively axial forces are applied to the hub and shaft in directions which tend to drive shaft steps 22 to 26 into hub steps 22 to 26 respectively. In this particular hub-shaft relationship there is a small clearance between shaft steps 23 to 26 and hub steps 22 to 25. While the axial forces are applied, a low viscosity liquid such as glycerene is forced under very high pressure in between the hub and shaft from a source connected to fitting 37. The liquid flows through passage 35, 36 into groove 32, from here into grooves 27 and in between the hub-shaft surfaces extending from about seal 39, 40 to the vicinity of the shaft step at 31, and perhaps some leakage beyond this step to be contained by the seal at 38a. This high pressure liquid causes the hub to expand sufficiently that relative axial movement takes place between the hub and shaft from the axial forces. When shaft steps 22 to 26 lie diametrically opposite hub steps 22 to 26 respectively, the pressure is relieved and the hub allowed to contract onto the shaft. Each step on the shaft will now be an interference fit inside the corresponding step in the hub. To remove the hub from the shaft, the liquid is again applied at high pressure to expand the hub while axial forces are applied in the opposite sense so as to drive the shaft out of the hub.

As pointed out earlier a two-step configuration requires a long axial travel for inserting the shaft into or removing it from the hub. This long travel not only complicates the process of assembly and disassembly, but it also increases the chances of scoring the mating surfaces. For the best results the hub should be so expanded that it floats onto the shaft on a thin film of the liquid without any bare hub surfaces dragging on bare shaft surfaces.

This invention provides means for reducing axial travel and the chances of drag. It has been found that five steps of about equal axial length and a liquid pressure acting on the leading four steps, i.e., about 80 percent of the total step length, enhances assembly and disassembly and lessens the chances of drag which usually leads to scoring of the surfaces. Although five steps have been found to be a practical means for obtaining very good results, the invention is not so limited. The mathematical analysis to follow will demonstrate why five steps has been selected as a practical configuration. A multiple of five may also be useful in some instances, or even less than five in certain other applications. Stated otherwise, approximately 80 percent of the stepped surface of the larger internal hub diameter is subjected to the liquid pressure and the remaining 20 percent is not. The pressurized portion is the forward 80 percent of the hub as it advances axially onto the shaft, and the unpressurized portion is the remaining 20 percent at the trailing end of the hub. This is illustrated in FIG. 5 where hub steps 22H to 25H are subjected to the liquid pressure while step 26H is not. It has been found that the 20 percent is, for all practical purposes, the attenuation length of the hub when it is expanded. In the preferred form of this invention step 26H is made approximately equal to the attenuation length, and the other four steps 22H to 25H the same length as step 26H.

Referring to FIG. 5, when the hub is expanded by means of a high pressure liquid applied between it and the shaft from point 41 to point 42, discontinuity stresses are induced in the hub between points 42 and 43 due to a local mismatch of element deflections. The attenuation length, $L = 1/\beta$, defines how quickly the deflection dampens out along the hub. The damping factor $$\beta = \sqrt[4]{3(1-\mu^2)/R^2 t^2}.$$

where
$\mu$ = Poison's ratio,
$R$ = average hub radius,
$t$ = hub wall thickness.

From this expression it can be seen that the geometry of the hub and the material from which it is made directly influences step length. For steel $\mu$ may be taken as having a valve of 0.3. Then in equation
$L = 1/\beta$,
$L = 0.78 \sqrt{Rt}$. If the hub overhang 42 to 43, i.e., the hub trailing end portion free from liquid pressure, is less than one half the attenuation length, the ring analysis applies. If this hub portion 42 to 43 is less or equal to 1.5 times the attenuation length, it is possible to insert the shaft into the hub with little or no drag between the surfaces. Stated otherwise, under *these conditions the shaft can be advanced axially into the bore of the hub on a film of the liquid with little or no danger of scoring.*

What I claim as new and desire to secure by Letters Patent of the United States is:

1. A hub-shaft combination comprising a hub having a bore formed with $n$ cylindrical portions of stepped configuration progressively decreasing in diameter from the first portion at one end of the hub to the $n$th portion at the other end of the hub; a shaft having its periphery formed with $n$ cylindrical portions of stepped configuration progressively decreasing in diameter from the first to the $n$ portion in the same order as the hub portions, said hub portions one to $n$ respectively being an interference fit with respect to said shaft portions one to $n$ respectively, and said hub portions one to $n-1$ respectively being a clearance fit with respect to said shaft portions two to $n$ respectively; and means for applying a liquid at high pressure between said hub and shaft from near said one end of the hub to a region therein a distance from said other end of the hub less or equal to 1.5 times the value of the expression $$1 \quad \sqrt[4]{3(1-\mu^2)/R^2 t^2},$$

where $R$ is the average radius of the hub, $t$ is the average wall thickness of the hub, and $\mu$ is Poison's ratio.

2. A steel hub-shaft combination comprising a hub having a bore formed with n cylindrical portions of stepped configuration progressively decreasing in diameter from the first portion at one end of the hub to the $n$th portion at the other end of the hub; a shaft having its periphery formed with $n$ cylindrical portions of stepped configuration progressively decreasing in diameter from the first to the $n$ portion in the same order as the hub portions, said hub portions one to $n$ respectively being an interference fit with respect to said shaft portions one to $n$ respectively, and said hub portions one to $n-1$ respectively being a clearance fit with respect to said shaft portions two to $n$ respectively; and means for applying a liquid at high pressure between said hub and shaft from near said one end of the hub to a region therein a distance from said other end of the hub less or equal to 1.5 times the value of the expression 0.78 $\sqrt{Rt}$, where $R$ is the average radius of the hub and $t$ is the average wall thickness of the hub.

3. The combination defined in claim 1 wherein $n$ is five.

4. The combination defined in claim 1, wherein said means for applying said liquid between the hub and shaft comprises an annular groove in the bore of the hub at each step-in point of said cylindrical portions; an axial groove in the bore of said hub extending from near said one end of the hub to said region and intersecting said annular grooves; and a liquid flow passage in the hub in communication with said grooves and terminating at the outer surface of the hub.

5. The combination defined in claim 1 wherein the value of said expression is approximately equal to the axial length of each one of said cylindrical portions.

6. The combination defined in claim 1, wherein the bore of said hub is provided with an annular groove at said one end of the hub, and the groove contains liquid sealing means.

7. The combination defined in claim 1, wherein the bore of said hub is provided with an annular groove at said one end of the hub and another groove near said other end of the hub, and each groove contains liquid sealing means.

8. The combination defined in claim 2 wherein n is five.

9. The combination defined in claim 2 wherein the value of said expression is approximately equal to the axial length of each one of said cylindrical portions.

* * * * *